Sept. 15, 1964  G. W. SWITZER, JR  3,148,665
BOILER WASTE HEAT RECOVERY PROCESS
Filed Aug. 11, 1961
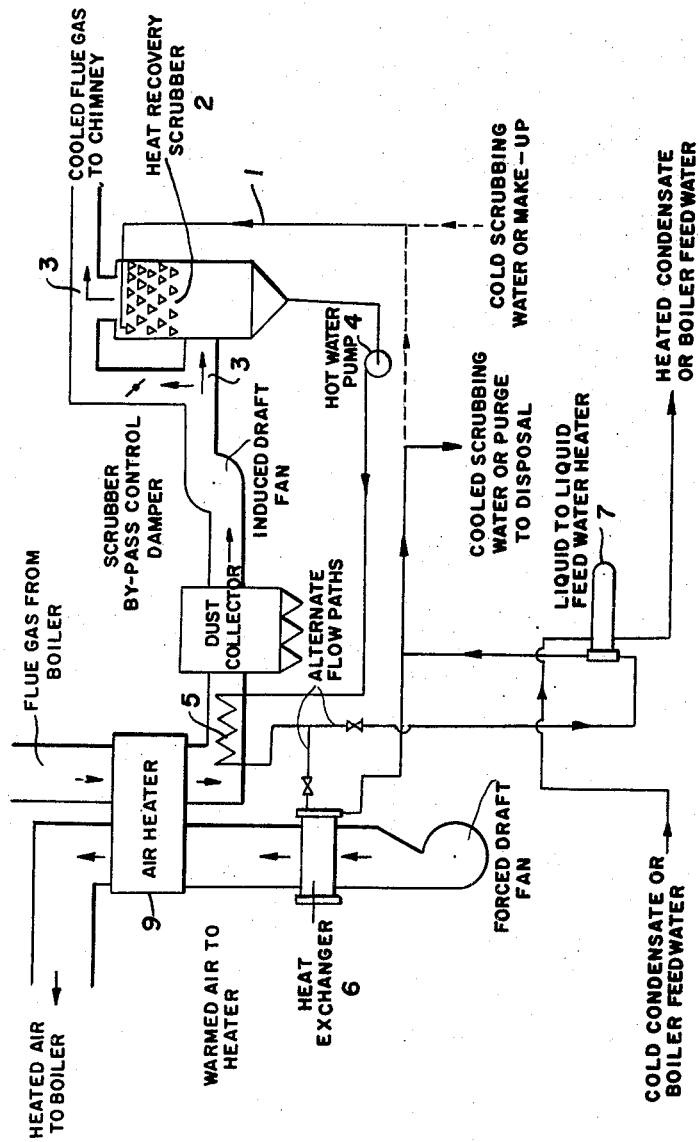
INVENTOR.
George W. Switzer Jr.
BY
*William J. Ruano*
his ATTORNEY

United States Patent Office 3,148,665
Patented Sept. 15, 1964

3,148,665
BOILER WASTE HEAT RECOVERY PROCESS
George W. Switzer, Jr., Reading, Pa., assignor to Gilbert Associates, Inc., Reading, Pa.
Filed Aug. 11, 1961, Ser. No. 130,955
3 Claims. (Cl. 122—1)

This invention relates to a boiler waste heat recovery process and, more specifically, relates to a system for recovering heat from boiler exit flue gases before these gases are rejected or expelled to the outside atmosphere. The present application is a continuation-in-part of my application Serial No. 774,726 filed November 18, 1958, now abandoned.

It is well-known to use, in connection with a modern boiler, items such as an air heater, dust collector, forced draft fan and induced draft fan. An outstanding disadvantage of conventional systems using these elements is that they are inefficient particularly from the standpoint of loss of heat from the boiler exit flue gases.

An object of this invention is to provide a novel heat recovery system for a boiler which is devoid of the above-named disadvantage of conventional systems and which will effectively recover a considerable portion of the heat normally lost from the boiler exit flue gases.

Broadly stated, the present invention relates to a heat recovery process which includes a novel combination and disposition of elements, including a heat recovery scrubber, a heat exchanger in the gas path downstream from the air heater, a heat exchanger in the air path between the forced draft fan and the air heater, a liquid to liquid feedwater heater, and a scrubbing water pump, as well as a specific interconnecting piping system.

Other objects and advantages of the present invention will become more apparent from a study of the following description taken with the accompanying drawing wherein;

The single figure is a schematic or flow diagraphm showing a boiler system including means for recovering heat from boiler exit flue gases in accordance with the principles of the present invention.

Referring more particularly to the drawing illustrating a system for boilers and embodying the present invention, numeral 1 denotes the path of cool scrubbing water which is introduced into the top of a heat recovery scrubber 2, which water flows downwardly in the scrubber while the flue gas flows upwardly in the scrubber as shown by arrows 3. This results in a cooling of the flue gas and warming of the scrubbing water. The warmed water collects in the bottom of scrubber 2 and, by means of a hot water pump 4, is passed through a heat exchanger 5 in counterflow to the flue gas leaving the air heater. This heats the water further and a portion of the heated water is then passed through a heat exchanger 6 in the path of the cold air entering the air heater 9. The remainder of the heated water is passed through a heat exchanger 7 in the path of condensate or feedwater in the boiler plant.

These exchanges of heat result in heating the air to the air heater and the condensate or feedwater and the cooling of the circulating water. The cooled scrubbing water may be reintroduced into the scrubber 2 in closed circuit or wasted.

The final result of the above described process is to recover heat which is usually wasted and return it to the steam generation cycle resulting in improved economy of the steam and power generation, therefore higher efficiency in operation and a considerable reduction in operating costs.

The use of the heat recovery scrubber 2 to recover heat from gases before they are finally rejected and discharged into the atmosphere is deemed to be a novel concept or innovation in flue gas heat recovery practice. This scrubber causes direct intimate contact between the water and the flue gas and has the outstanding advantage of close approach of the temperature of the exit gas to that of the incoming water.

In order to cool the flue gases to a temperature closely approaching that of the incoming scrubbing water, it is essential that the scrubber be specifically designed for the purpose. The scrubber must be provided with a packing, or stage dividers of some sort so that the exchange of heat will occur with a gradient of temperature between the top and the bottom of the scrubber. If these provisions are not made, and the water is simply sprayed or sprinkled into the flue gas in the free space of a vessel or enclosure the temperature of the gas leaving the scrubber and its heat content will be only slightly influenced by the temperature of the incoming water. The reason for this is as follows:

The flue gas entering the scrubber will have a certain temperature and an initial dewpoint temperature determined by its moisture content. When this gas comes into contact with drops of water, it will supply heat to the water since it is at a higher temperature than the water. This heat lost from the flue gas results in a lowering of the flue gas temperature and a vaporization of water. The water vapor mixes with the flue gas and raises its dewpoint. The limit point of this process is reached when the actual temperature and the dewpoint temperature of the gas become the same. Thus in a single stage of spray, the gases cannot be cooled below the temperature of the final dewpoint which is determined by the initial dewpoint temperature of the gas and its initial temperature above the dewpoint temperature.

On the other hand, if the gases and water vapor at the final dewpoint described above are made to pass into another vessel, compartment, or separated zone and sprayed with cooler water, the resultant heat exchange between the warm, wet gas and the cool water will result in condensing some of the water vapor from the gas, lowering the temperature of the gas, and warming of the water.

Therefore, a scrubber having a single vessel, compartment or zone for the gas to contact water cannot recover in the water any appreciable amount of the heat in the gas since it will only change the sensible temperature heat in the gas to latent heat of the water vapor which will mix with the gas and be discharged with it to the outlet.

Thus for the purpose of this invention, the term "heat recovery scrubber" refers to a scrubber equipped with packing, stages, or separated zones.

Although scrubbers are used as cooling towers, there the gas is heated rather than cooled. Therefore the use of the present type of apparatus to cool gases and heat water is contrary to usual practice. In some cases, this cooling of the flue gas will result in removal of initially contained water vapor from the flue gases.

The present process provides additional inherent benefits incidental to its main purpose of recovering heat from waste gases which are as follows:

(1) It results in raising of the temperature of the inlet gas to the air heater and prevents condensation of acidic vapors in the air heater and thereby lessens the attrition of the air heater surface from corrosion.

(2) It supplies heat to boiler feedwater and avoids withdrawing stream from the turbine to heat feedwater as it usually done in practice, thus the steam not so withdrawn can continue through the turbine and generate additional power.

(3) The cooled scrubbing water purged from the circuit may contain recoverable byproducts.

(4) The washing of the flue gases in the scrubber will afford cleaner gases emitted or discharged to the atmosphere and will, in some cases, permit elimination of the dust collector.

Thus it will be seen that I have provided a highly efficient boiler waste heat recovery process for use with boilers, which process will result in recovery of heat from boiler exit flue gases before these gases are expelled and lost to the outside atmosphere; furthermore, in aidtion to recovery of heat which is usually wasted and its return to the steam generation cycle to result in improved economy of steam and power generation, the invention also prevents corrosion of the air heater surface, avoidance of withdrawal of steam from the turbine to heat the feedwater, facilitates recovery of byproducts through the cooled scrubbing water, and results in the discharge of clearer gases in the atmosphere so as to prevent contamination of the vicinity of the plant with dirt particles.

While I have illustrated and described a single specific embodiment of my invention, it will be understood that this is by way of illustration only, and that various changes and modifications may be made within the contemplation of my invention and within the scope of the following claims.

I claim:
1. A boiler waste heat recovery system for a fuel combustion furnace system including a boiler, comprising an air heater for preheating air introduced in the boiler, a boiler air inlet conduit including fan means and said air heater for forcing said preheated air to the boiler, a chimney duct, a second conduit for passing flue gas from the boiler through said air heater to said chimney duct comprising a heat recovery scrubber in series with said second conduit and chimney duct and including packing means in said scrubber through which cold water is introduced from the top and flows downwardly therethrough in said scrubber while hot flue gas from said second conduit flows upwardly therethrough, thereby considerably cooling the flue gas and warming the downflowing water, a heat exchanger in said second conduit in counterflow to the gas leaving said air heater for further heating said water, a second heat exchanger in said boiler air inlet conduit in series with said first mentioned heat exchanger and in the path of the cold air entering said heater through which said heated water is passed for preheating, air flowing to said air heater and a pump connected between the bottom of said heat recovery scrubber and said first mentioned heat exchanger for circulating water warmed by said scrubber through said heat exchangers.

2. A boiler waste heat recovery system as recited in claim 1 together with a third heat exchanger connected to said heat recovery scrubber and means introducing boiler feedwater into said third heat exchanger including means by which a portion of the heated water passes through said third heat exchanger to heat the boiler feedwater.

3. A boiler waste heat recovery system for a fuel combustion furnace system including a boiler, comprising an air heater, a boiler air inlet conduit including said heater and a forced draft fan for forcing air through said heater to said boiler, a chimney duct, a flue gas conduit leading from the boiler through said air heater to said chimney duct, a dust collector and a heat recovery scrubber in said flue gas conduit together with an induced draft fan located between said dust collector and heat recovery scrubber for forcing air through said dust collector and scrubber to said chimney duct, said scrubber including packing means, a cold water system for introducing cold water into the top of said scrubber and through said packing means counter to the upward flow of flue gas therethrough for heating the water, a duct-by-passing said scrubber and leading to said chimney duct, a control damper in said by-passing duct, a heat exchanger in said flue gas conduit between said air heater and dust collector, said heat exchanger including an inlet and an outlet, a water pump connecting the bottom of said scrubber to said heat exchanger for passing said heated water through said heat exchanger, and a second heat exchanger connected to said outlet of said first mentioned heat exchanger and located in said boiler air inlet conduit between said forced draft fan and air heater and through which a portion of said heated water is passed by said pump for preheating air flowing to said heater.

References Cited in the file of this patent
UNITED STATES PATENTS

| | | |
|---|---|---|
| 597,727 | Maloney | Jan. 25, 1898 |
| 1,235,928 | Sargent et al. | Aug. 7, 1917 |
| 2,054,315 | Ebner et al. | Sept. 15, 1936 |
| 2,303,811 | Badenhausen | Dec. 1, 1942 |
| 2,537,558 | Tiggs | Jan. 9, 1951 |
| 2,560,635 | Conyers | July 17, 1951 |

FOREIGN PATENTS

| | | |
|---|---|---|
| 224,677 | Australia | Mar. 19, 1959 |
| 465,918 | Canada | June 20, 1950 |